United States Patent [19]

Hoffman

[11] Patent Number: 4,480,622

[45] Date of Patent: Nov. 6, 1984

[54] FUEL VAPORIZER

[76] Inventor: Paul H. Hoffman, 18003 NW. 78th Ave., Hiaheah, Fla. 33015

[21] Appl. No.: 534,409

[22] Filed: Sep. 21, 1983

[51] Int. Cl.$^3$ .......................................... F02M 31/00
[52] U.S. Cl. .................................. 123/557; 261/145; 165/52
[58] Field of Search ...................... 123/546, 547, 557; 261/144, 145; 165/52

[56] References Cited

U.S. PATENT DOCUMENTS

| 1,101,365 | 6/1914 | Weaver | 123/557 |
| 1,234,116 | 7/1917 | Barcus | 123/557 |
| 1,251,185 | 12/1917 | Cummings | 165/52 |
| 1,273,363 | 7/1918 | Hale | 165/52 |
| 1,642,268 | 9/1927 | Scott | 261/144 |
| 1,653,758 | 12/1927 | Cain | 261/144 |
| 1,945,178 | 1/1934 | Carter | 123/546 |
| 4,388,910 | 6/1983 | Birdwell | 123/546 |

FOREIGN PATENT DOCUMENTS

| 102574 | 3/1937 | Australia | 261/145 |
| 113804 | 9/1941 | Australia | 165/52 |
| 2506846 | 3/1982 | France | 123/557 |
| 9724 | 4/1914 | United Kingdom | 261/144 |

*Primary Examiner*—Ronald H. Lazarus
*Attorney, Agent, or Firm*—Dennis H. Lambert

[57] ABSTRACT

A fuel vaporizer for an internal combustion engine comprises an elongate vaporizer chamber having one end connected to a source of air and atomized liquid fuel and the other end connected with a throttle valve for controlling flow of vaporized fuel to the cylinders of an engine. A passage extends longitudinally of the chamber for flow of hot exhaust gasses in heat exchange relationship with the air and atomized fuel mixture to vaporize the fuel to a heated, dry vaporous state. The atomized fuel and air mixture flows through a plurality of passages extending through a body of material having high thermal conductivity.

1 Claim, 4 Drawing Figures

FUEL VAPORIZER

BACKGROUND OF THE INVENTION

1. Field of the Invention

This invention relates generally to fuel vaporizer devices for vaporizing liquid fuel supplied to an internal combustion engine. More particularly, the invention relates to such a device which vaporizes the liquid fuel to a dry, heated vaporous state in a mixture with heated air and supplies the heated mixture to the cylinders of the engine.

2. Prior Art

Numerous attempts have been made in the prior art to more completely vaporize the liquid fuel supplied to internal combustion engines in order to reduce the pollutants discharged into the atmosphere with the exhaust from the engine, or to improve the performance and/or efficiency of the engine. Standard carburetors as commonly used on internal combustion engines use atomizing nozzles or jets which at least partially atomize the liquid fuel supplied to the cylinders of the engine. These devices rely upon mechanical breakup of the liquid droplets of fuel, and typically introduce the liquid fuel into the throat of a venturi which, due to the sudden drop of pressure in the venturi, causes the droplets to break up into small particles of liquid fuel. The small particles of droplets of liquid fuel are then supplied to the cylinders of the engine for combustion. However, the liquid particles do not burn completely and as a result various pollutants are discharged into the atmosphere with the exhaust from the engine.

Some of the prior art devices have attempted to overcome the problems discussed above by increasing the breakup or vaporization of the liquid fuel. The enhanced or increased vaporization is achieved in a number of ways, including mechanically contacting the particles or droplets of liquid fuel with rotating blades or by causing the fuel to flow through or past screens or swirl chambers and the like. Other devices use heating means to heat the fuel.

Examples of some such prior art devices are described in U.S. Pat. Nos. 1,006,244, 1,997,497, 2,254,634, 2,261,446, 2,733,698, 3,618,577, 4,022,173, 4,106,457, 4,151,821 and 4,330,492. These devices variously mix the air/fuel mixture with hot exhaust gas; use hot exhaust gas or electrical resistance elements to heat the fuel and/or air supplied to the cylinders of the engine; and/or mechanically contact the fuel to cause it to break up into fine particles. However, these devices are either relatively complicated and expensive or they achieve only partial atomization, albeit better than a standard carburetor. Some devices, such as that disclosed in U.S. Pat. No. 1,997,497 to C. N. Pogue, purport to achieve substantially complete atomization of the liquid fuel, whereby a hot, dry gas is supplied to the cylinders of the engine.

SUMMARY OF THE INVENTION

Accordingly, it is a primary object of this invention to provide a fuel vaporizing device which substantially completely vaporizes the liquid fuel before the fuel is supplied to the cylinders of the engine, whereby more complete combustion of the fuel takes place, with consequent increased efficiency and reduced pollutants.

Another object of the invention is to provide a fuel vaporizing device which produces a hot, dry gaseous vapor from liquid fuel, thus enabling substantially complete combustion of the fuel to take place in the cylinders of the engine.

A further object of the invention is to provide a fuel vaporizing device which is simple and economical in construction, and which achieves substantially complete vaporization of liquid fuel, producing a hot, dry gaseous vapor for supply to the cylinders of the engine.

Still another object of the invention is to provide a fuel vaporizer which is a simple retrofit onto existing fuel supply systems for internal combustion engines, and which achieves substantially complete vaporization of liquid fuel supplied thereto, producing a hot, dry gaseous vapor which is readily exploded in the cylinders of the engine.

These and other objects of the invention are accomplished by the use of fuel vaporizing chambers having heat exchange means associated therewith for heating and completely vaporizing droplets of liquid fuel supplied thereto, producing a hot, dry gaseous mixture of fuel and air which is then fed into the cylinders of the engine. According to the invention, the vaporization chamber is heated with hot exhaust gasses from the engine. Supplemental fuel suppy means may be provided for introducing fuel during starting of the engine, or under acceleration, etc. The liquid fuel is atomized in an atomizer, which may be a carburetor with conventional design, and the air and atomized fuel mixture is then caused to flow through a plurality of parallel passages extending in concentric relationship around a central passage through which hot exhaust gasses flow. The heated air and fuel mixture then flows into the intake manifold, while the hot exhaust gas is exhausted to atmosphere.

Contrary to expectations, the hot, dry gaseous fuel vapor produced by the vaporizer of the invention does not result in overheating of the engine or burning of the valves when supplied to the cylinders of the engine and combusted. On the other hand, substantial improvement in fuel economy is achieved, and, it is expected, substantial reduction in pollutants will also result due to the substantially complete combustion of the fuel. The invention will thus not only achieve enormous energy savings but will also significantly reduce the amount of pollutants introduced into the atmosphere, while at the same time eliminating the necessity of providing expensive catalytic converters and the like on new vehicles in order to meet emission control standards.

BRIEF DESCRIPTION OF THE DRAWINGS

Referring now to the drawings, wherein like reference characters refer to like parts throughout the several views, and wherein.

DETAILED DESCRIPTION OF THE PREFERRED EMBODIMENTS

Figure 1:
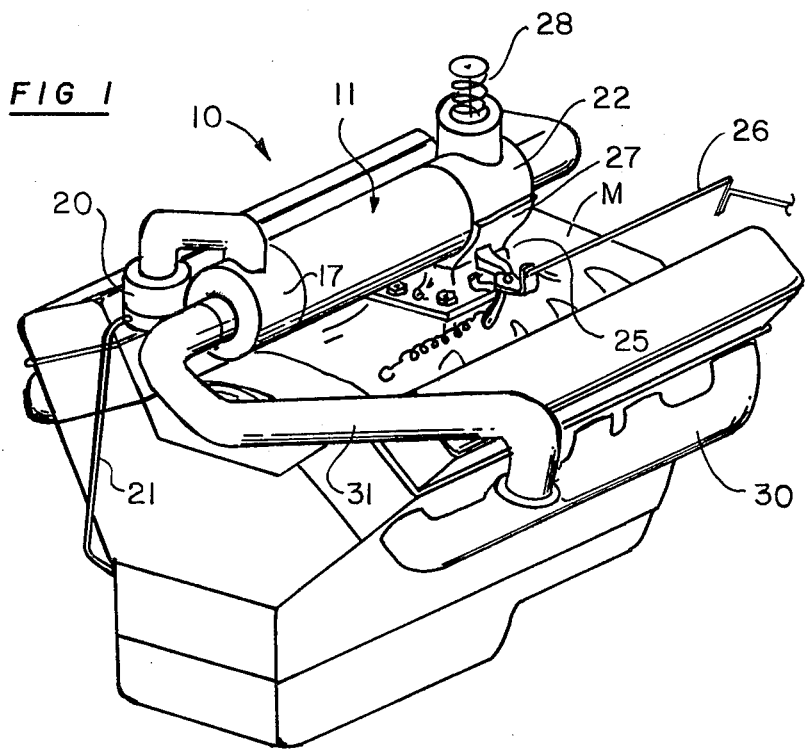
FIG. 1 is a front perspective view of an engine having the invention associated therewith.
Figures 2, 3:
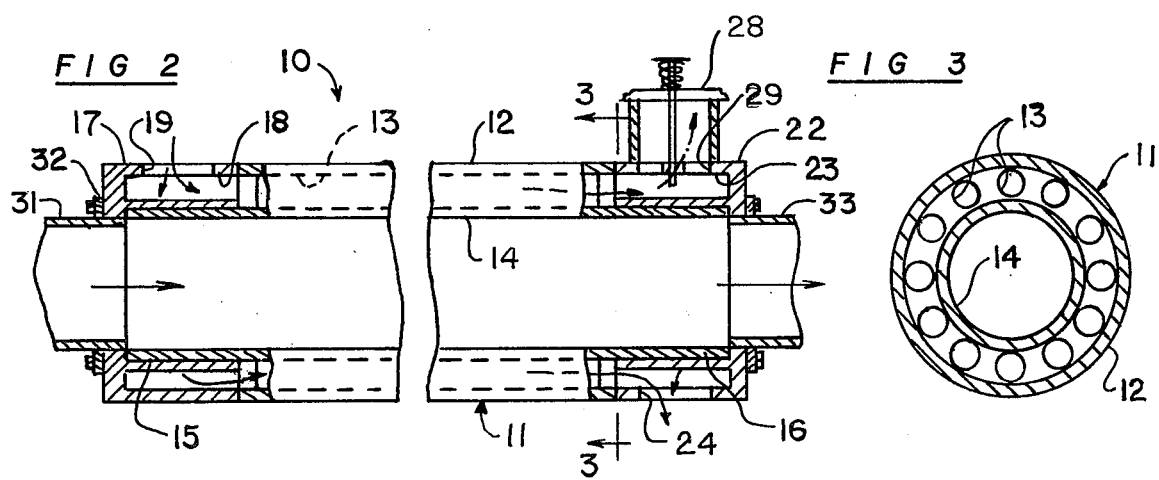
FIG. 2 is an enlarged longitudinal sectional view of the heat exchanger vaporizing chamber of the invention.
FIG. 3 is a transverse sectional view taken along line 3—3 in FIG. 2.

The fuel vaporizer of the invention is indicated generally at 10 in the drawing and comprises an elongate vaporizing chamber 11 having a heat exchange body 12 formed of a material with high thermal conductivity. The heat exchange body 12 has a plurality of parallel passages 13 extending longitudinally thereof between the outer surface and a central longitudinally extending passage 14. The body also has longitudinally extending cylindrical projections 15 and 16 on opposite ends thereof, radially inwardly of the passages 13 and defining opposite end portions of the central passage 14.

An inlet manifold or chamber 17 is received on the cylindrical projection 15 at one end of the body, and has an annular chamber 18 defined therein in communication with the passages 13. An air and atomized fuel inlet 19 is in the top of the manifold 17 for admitting air and atomized fuel mixture from a suitable source, such as atomizer 20, having an air intake (not shown) in the bottom free end thereof and a fuel inlet supplied from fuel line 21.

A similarly constructed outlet manifold or chamber 22 is received on the cylindrical projection 16 at the other end of the body 12, and has an annular chamber 23 formed therein in communication with the passages 13 for receiving the air and fuel mixture heated therein. An outlet 24 is formed in the bottom of the manifold 22 for conducting the heated air and fuel mixture to a throttle valve assembly 25 mounted on the intake manifold M of the engine. The throttle valve assembly may contain idle mixture and idle speed adjusting screws, in addition to one or more butterfly valves controlled from throttle linkage 26, and includes a cradle-shaped support 27 to which the vaporizing chamber 11 is attached by any suitable means.

A spring loaded pressure relief valve 28 is mounted over an upstanding back-fire relief opening 29 to prevent damage to the vaporizing chamber 11 in the vent of a back-fire.

As shown in FIG. 1, one of the exhaust manifolds 30 may be inverted and the outlet therefrom bolted to a pipe 31 which leads to the inlet manifold 17 on the vaporizing chamber 11.

The pipe 31 may be attached to the manifold 17 in any suitable way and is shown as having a flange 32 bolted to the manifold 17. An outlet pipe 33 is similarly bolted to the outlet manifold 22. Thus, hot exhaust gas from the engine is collected in the exhaust heater or manifold 30 and conveyed through the pipe 31 to the central passage 14 to heat air and atomized fuel mixture flowing through the passages 13. The exhaust gas is collected in the outlet pipe 33 and conveyed to a suitable muffler and exhaust pipe.

The apparatus is exceptionally simple in construction and operation and may be readily retrofitted to existing engines simply by unbolting the existing, conventional carburetor and bolting on the invention via the throttle valve assembly 25, which serves as an adapter to the intake manifold M. A specially adapted exhaust header may be provided or the existing manifold may simply be inverted and bolted to the pipe 31, as described above.

Figure 4:
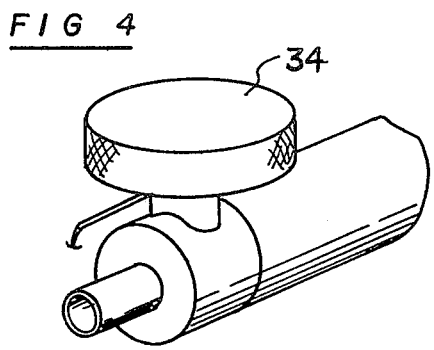
FIG. 4 is a fragmentary perspective view of a modification of the invention.

A modification of the invention is shown in FIG. 4, wherein a downdraft type fuel atomizer 34 is mounted on top of the inlet manifold 17, as distinguished from that shown in FIG. 1.

A typical vaporizer in accordance with the invention is about 15 inches long and 4 inches in diameter, and the total cross-sectional flow area of the passages 13 is approximately twice as great as the area of the intake opening 19.

The heat exchange body 12 may be made of any suitable thermally conductive material, such as steel or aluminum.

While the fuel vaporizer has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A fuel vaporizer for an internal combustion engine, comprising:

an elongate, tubular heat exchange body formed of a thermally conductive material;

a longitudinally extending exhaust gas passage formed centrally through the body, and a plurality of smaller longitudinally extending fuel vaporizing passages formed through the body in parallel, concentric relationship around the central passage, all of said passages opening axially through the opposite ends of the body;

an inlet manifold connected with one end of the body, and an outlet manifold connected with the other end thereof, said inlet and outlet manifolds having centrally disposed, axially oriented exhaust gas inlet and outlet openings therein, respectively, for connecting the exhaust from an engine to the central passage for unimpeded flow of exhaust gas therethrough, said inlet and outlet manifolds further having annular chambers therein in communication, respectively, with the inlet and outlet ends of the fuel vaporizing passages, and a fuel inlet to the inlet manifold chamber and a fuel outlet from the outlet manifold chamber, said fuel vaporizing passages having a combined cross-sectional flow area approximately twice as great as the cross-sectional flow area of the fuel inlet, whereby vaporized fuel and air mixture is enabled to expand in said passages and the flow velocity thereof is decreased to promote heat exchange between the body and air/fuel mixture;

a fuel atomizer and air/fuel mixing means connected with the fuel inlet to the inlet manifold chamber to supply atomized fuel and air mixture to the fuel vaporizing passages;

a combination adapter and butterfly valve means connected with the fuel outlet from the outlet manifold chamber, said adapter being constructed to attach to the intake manifold of an engine in place of the conventional carburetor and to support the heat exchange body on the intake manifold, whereby the heated, vaporized air/fuel mixture flows directly into the intake manifold of the engine while in its heated, vaporized condition and before cooling of the mixture can take place, said butterfly valve means being adapted to be connected to the throttle linkage of an engine on which the vaporizer is mounted for controlling the flow of heated air and vaporized fuel mixture to the intake manifold of the engine; and a backfire relief valve on the outlet manifold in communication with the chamber therein for relief of pressure in the event of a backfire.

* * * * *